US009191115B2

(12) United States Patent
Sharma et al.

(10) Patent No.: US 9,191,115 B2
(45) Date of Patent: Nov. 17, 2015

(54) METHOD FOR CONFIGURING END-TO-END LOWER ORDER ODU NETWORK TRAILS ACROSS OPTICAL TRANSPORT NETWORK

(75) Inventors: Nishant Sharma, Bangalore (IN); Nikhil Satyarthi, Bangalore (IN); Vivek Subramanian, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 128 days.

(21) Appl. No.: 13/982,491

(22) PCT Filed: Jul. 7, 2011

(86) PCT No.: PCT/IB2011/053021
§ 371 (c)(1),
(2), (4) Date: Jul. 30, 2013

(87) PCT Pub. No.: WO2012/104683
PCT Pub. Date: Aug. 9, 2012

(65) Prior Publication Data
US 2013/0315592 A1 Nov. 28, 2013

(30) Foreign Application Priority Data

Feb. 3, 2011 (IN) .............................. 324/CHE/2011

(51) Int. Cl.
*H04J 3/16* (2006.01)
*H04L 12/43* (2006.01)
*H04B 10/27* (2013.01)
(52) U.S. Cl.
CPC .............. *H04B 10/27* (2013.01); *H04J 3/1652* (2013.01); *H04J 2203/0091* (2013.01)

(58) Field of Classification Search
USPC .................................. 370/458, 465, 468, 535
See application file for complete search history.

(56) References Cited

U.S. PATENT DOCUMENTS

| 2003/0097472 | A1 | 5/2003 | Brissette |
| 2006/0104309 | A1 | 5/2006 | Vissers et al. |
| 2007/0248121 | A1 | 10/2007 | Zou |
| 2009/0252155 | A1* | 10/2009 | Masuya et al. ................. 370/352 |
| 2010/0183301 | A1* | 7/2010 | Shin et al. ......................... 398/45 |
| 2012/0014270 | A1* | 1/2012 | Honma et al. ................. 370/252 |
| 2012/0189304 | A1* | 7/2012 | Lin et al. .......................... 398/43 |
| 2012/0224857 | A1* | 9/2012 | Su et al. .......................... 398/98 |
| 2012/0230674 | A1* | 9/2012 | Yuan et al. ....................... 398/17 |
| 2013/0022056 | A1* | 1/2013 | Crosby et al. ................. 370/468 |
| 2013/0243428 | A1* | 9/2013 | Mutoh et al. .................... 398/45 |
| 2014/0133653 | A1* | 5/2014 | Loprieno et al. .............. 380/256 |

* cited by examiner

*Primary Examiner* — Andrew Lee
(74) *Attorney, Agent, or Firm* — Deborah Gador

(57) ABSTRACT

The disclosure relates to a method of configuring end-to-end ODUj (lower order ODU) network trails across OTN (Optical Transport Network), in which the tributary port number (TPN) of the lower order ODUj inside higher order ODUk is specified. The time-slot value associated with the TPN is not to be specified by the user. The time-slots are dynamically allocated on the transmit side. On the receive side, there would be a capability in the ODUk adaptation sink function to find the set of time-slots associated with the TPN based on the received multiplex structure identifier (MSI). That is for an ODUj entity with a fixed TPN, the transmitted time-slots can change and the receive end can detect this change and based on that de-multiplex the ODUj from the ODUk.

13 Claims, 9 Drawing Sheets

|  | 1 | 2 3 | 4 5 | 6 7 | 8 |  |
|---|---|---|---|---|---|---|
| *PSI[2]* | ODTU type | | Tributary Port # | | | *TS1* |
| *PSI[3]* | ODTU type | | Tributary Port # | | | *TS2* |
| *PSI[4]* | ODTU type | | Tributary Port # | | | *TS3* |
| *PSI[5]* | ODTU type | | Tributary Port # | | | *TS4* |
| *PSI[6]* | ODTU type | | Tributary Port # | | | *TS5* |
| *PSI[7]* | ODTU type | | Tributary Port # | | | *TS6* |
| *PSI[8]* | ODTU type | | Tributary Port # | | | *TS7* |
| *PSI[9]* | ODTU type | | Tributary Port # | | | *TS8* |
| *PSI[10]* | ODTU type | | Tributary Port # | | | *TS9* |
| *PSI[11]* | ODTU type | | Tributary Port # | | | *TS10* |
| *PSI[12]* | ODTU type | | Tributary Port # | | | *TS11* |
| *PSI[13]* | ODTU type | | Tributary Port # | | | *TS12* |
| *PSI[14]* | ODTU type | | Tributary Port # | | | *TS13* |
| *PSI[15]* | ODTU type | | Tributary Port # | | | *TS14* |
| *PSI[16]* | ODTU type | | Tributary Port # | | | *TS15* |
| *PSI[17]* | ODTU type | | Tributary Port # | | | *TS16* |

Figure 5

METHOD FOR CONFIGURING END-TO-END LOWER ORDER ODU NETWORK TRAILS ACROSS OPTICAL TRANSPORT NETWORK

CROSS-REFERENCE TO RELATED APPLICATIONS

The present application claims priority to Indian patent application serial number 324/CHE/2011 filed on Feb. 3, 2011, and claims the benefit of international application PCT/IB2011/053021 filed Jul. 7, 2011, the entire contents of which are incorporated by reference.

FIELD OF INVENTION

The present disclosure relates to OTN networks, especially relates to method of configuring lower order ODU across OTN network.

BACKGROUND OF THE INVENTION

Optical Transport Network (OTN) is a set of standards defined by the ITU-T for transmission of optical signals over fiber using wavelength division multiplexing (WDM). These standards cover the physical layer, signal rate, format specification, equipment functional requirements and OAM&P (Operation, Administration, Maintenance and Provisioning) for the network.

OTN provides a method to transport a client signal such as an STM-16/OC-48 or a 10G Ethernet or a storage area network (SAN) signal efficiently over fiber. Multiple client signals can be carried in the same fiber using time-division multiplexing (TDM) and WDM. OTN is significantly less complex compared to SONET/SDH and this reduced complexity offers optimized overhead and substantial reduction in costs. Further, the multiplexing bandwidth granularity is one or two orders of magnitude greater than SONET/SDH making OTN much more scalable to higher rates. It also provides an integrated forward error correction (FEC) mechanism that allows for greater reach between subsequent nodes and higher bit rates on the same fiber. This, too, adds to reduction in costs.

The Optical Channel Payload Unit (OPU) is the basic container that carries the client signal. The client signal is mapped into the payload area of the OPU using either the Asynchronous Mapping Procedure (AMP) or Generic Mapping Procedure (GMP). It is a set of overhead bytes containing information to support adaptation of the client signal. This overhead is terminated wherever the client signal is assembled or disassembled. The payload area of the OPU consists of 4 rows×3808 columns (columns 17-3824). The overhead area consists of 4 rows×2 columns (columns 15-16).

The Optical Data Channel Unit (ODU) consists of the OPU and an ODU overhead area. The ODU overhead area is 4 rows×14 columns (columns 1-14). Note that row 1 of this overhead area is reserved for the frame alignment bytes and the Optical Channel Transport Unit (OTU). The ODU overhead contains information for the maintenance and operational functionality to support optical channels. It also has provision for end-to-end path monitoring of the ODU path and up to six level of tandem connection monitoring. The overhead is terminated wherever the ODU is assembled or disassembled.

The Optical Channel Transport Unit (OTU) conditions the ODU for transport over an optical channel network connection. The OTU consists of a Framing Alignment (FA) overhead, OTU overhead and a FEC. The FEC is 4 rows×256 columns (columns 3825-4080). The FA overhead is a fixed standardized pattern that is used to detect the start of the OTU frame and a one byte multi-frame alignment signal to indicate the multi-frame number of the current OTU frame. The OTU overhead contains information for operational functional to support the transport via one or more optical channel connections. This overhead is terminated wherever the OTU is assembled or disassembled.

The following explains OTN Multiplexing Structure. At the ODU level, OTN supports a single level of multiplexing. The higher order ODU is designated as ODUk and the lower order ODUs contained within the ODUk as ODUj. The ODUk is divided into timeslots of 1.25 G (ODU0 capacity) in case of equipment adhering to the newer standard, while older equipment uses 2.5 G (ODU1 capacity) timeslots. The Table-I below illustrates the number of timeslots each ODU has.

TABLE I

| ODUk type | 2.5G timeslots | 1.25G timeslots |
|---|---|---|
| ODU1 | 1 | 2 |
| ODU2 | 4 | 8 |
| ODU3 | 16 | 32 |
| ODU4 | — | 80 |

Thus, an ODU2 may contain a maximum of 4 ODU1s or 8 ODU0. An ODU3 may contain a maximum of 16 ODU1, 4 ODU2 or 32 ODU0 and so on. The ODUk may contain a mix of ODUjs within the limit of the capacity of the ODUk.

The multiplexing of the ODUjs within the ODUk is done based on interleaving timeslots. FIG. 1 illustrates multiplexing of the ODUjs within the ODUk for k=2 and ODUj (j=1). The ODU1 overhead for each of the ODU1s repeats every four ODU2 frames. This is locked to bits 7 and 8 of the MFAS byte. Hence, for each ODU1 that is multiplexed as part of the ODU2 may have a justification opportunity every four ODU2 frames.

For inter-operating with older equipment that uses the 2.5 G timeslot scheme with newer equipment that use the 1.25 G timeslots, standards define that an ODU1 that is multiplexed into ODU2 uses the 'i' (i=1, 2, 3, 4) and the 'i+n' (n=4) timeslots. This ensures that the receiver would see the 'i'th ODU1 in every fourth column of the ODU2 payload area. Similarly for ODU3 i=1, 2 . . . 16 and n=16. This takes care of the overhead repeating exactly once every four frames.

The complete multiplexing hierarchy for ODUk through ODUj is shown in the FIG. 2.

In OTN based equipments it's a common requirement to map/de-map lower order ODUjs inside higher order ODUk's using an ODU connection function to route, groom and multiplex the ODUjs clients in an ODUk server.

In some of the HO ODUk's a mix of different LO ODUjs are allowed. If a restriction is imposed on the timeslot usage for a particular LO ODUj, it can lead to possible fragmentations at time slot level depending on the order of connections created. To avoid such fragmentations and ensure usage of complete bandwidth available in ODUk, the ODUjs are allowed to be flexibly mapped into any of the timeslots available.

The SDH systems have a connection model centered on connections identified by STM port number and timeslots S, K, L and M. Similarly, in the current state of the art, for OTN networks too the connection model is centered on time-slots occupied by the LO ODUj inside the HO ODUk. As illustrated in FIG. 3, the 'A' and 'Z' ends for an ODUj trail agree upon the set of time-slots which the ODUj will occupy inside the ODUk. The time-slots used at the originating end for the ODUj ('A') and those used at the receive end ('Z') hence must be the same. This agreement henceforth will be referred to as "policy" for a connection. Similarly, the "identity" of the ODUj in the network is based on the set of time-slots with which it's associated.

At either of the end-points of the network connection, the child ODUj (as a client) inside parent ODUk (as a server) is identified as follows:

ODUj identifier=[ODUk identifier],
[Set of timeslots in HO ODUk]

Since, the identity for the ODUj involves a set of time-slots, the 'A' and 'Z' ends have to agree upon their respective transmit (at 'A' end) and receive time-slots (at 'Z' end) if the intended ODUj trail is the transport entity being connected end-to-end.

As an example ODU3 is taken as an example of HO ODUk and ODU2 as a LO ODUj. An OPU3 (one to one mapped with the ODU3) when partitioned into 2.5 G timeslots looks as shown in FIG. 4 (taken from ITU-T G.709/Y.1331).

As shown in the FIG. 4 there are 16 tributary time-slots in each OPU3 frame. If one has to multiplex 4 ODU2s inside this OPU3 there is a flexibility provided in terms of each ODU2s taking any set of 4 timeslots out of these 16 timeslots. FIG. 5 shows the multiplex structure being carried in the PSI bytes over an ODU3 multi-frame.

The tributary port numbers (TPNs) are a way to group the time-slots and convey which single ODUj they conform to. The TPN to TS mapping is carried in the multiplex structure identifier (MSI). The ODTU type tells if the time-slot is carrying an ODTU13 or ODTU23.

The ODTU type field takes different meanings based on the OPUk type; here it's shown for an OPU3. For example for OPU4, the ODTU type field is absent and instead there's a 1 bit field which just says "allocated" or "unallocated".

As an example, when multiplexing 4 ODU2s in an OPU3 (mapped into ODU3 finally), the TPN values range from 1 to 4 with each value representing a single ODUj.

[TPN=1] represents an ODU2 in [TS=1, 10, 11, 16]
[TPN=2] represents an ODU2 in [TS=2, 4, 6, 8]
[TPN=3] represents an ODU2 in [TS=3, 13, 14, 15]
[TPN=4] represents an ODU2 in [TS=5, 7, 9, 12]

So, as an entity identification of an ODU2 on end-to-end basis one can set a policy between A and Z ends as shown in FIG. 3 that states as follows:

'A' end will transmit an ODU2 in question on [TS=1, 10, 11, 16]
'B' end must receive the same ODU2 in question on [TS=1, 10, 11, 16]

In this case, if one end has to setup a connection in the network, that end is expected to choose these 4 ODU2 timeslots inside the ODU3. This is a traditional method by specifying the time-slots.

BRIEF DESCRIPTION OF THE DRAWINGS

Figure 1:
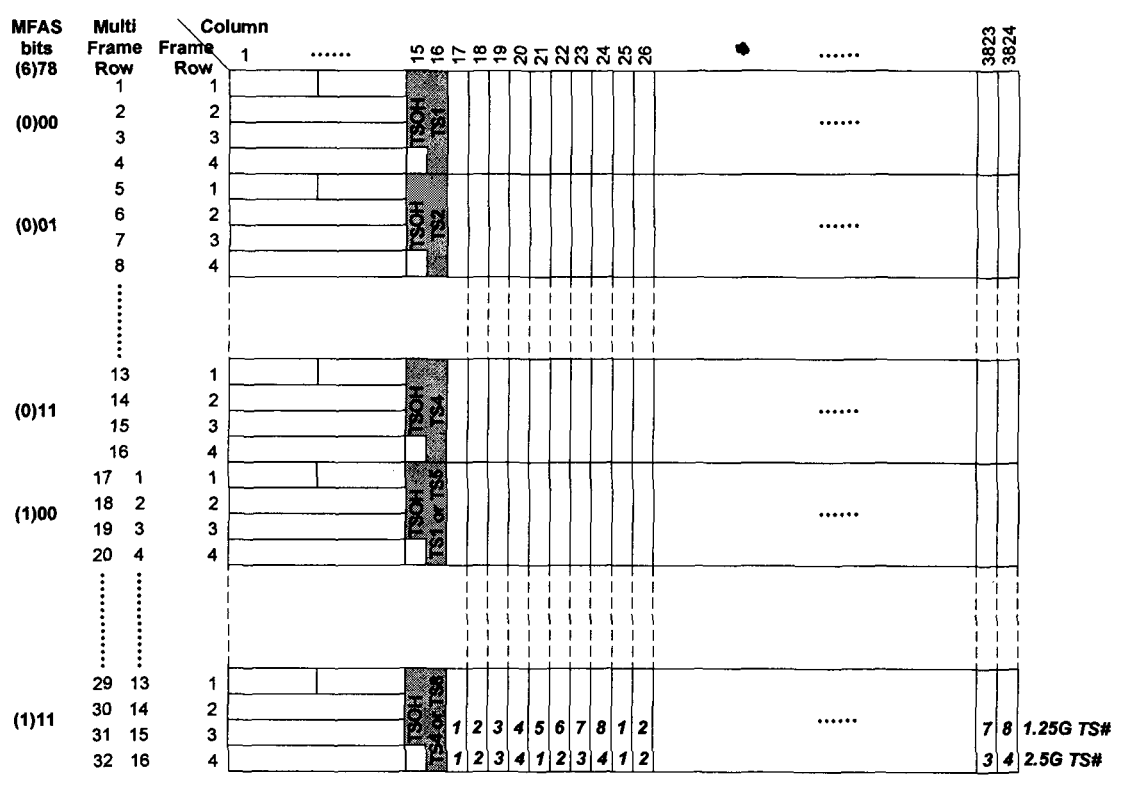

FIG. 1 illustrates multiplexing of the ODUjs within the ODUk, as an example for ODU2 and ODU1.

Figure 4:
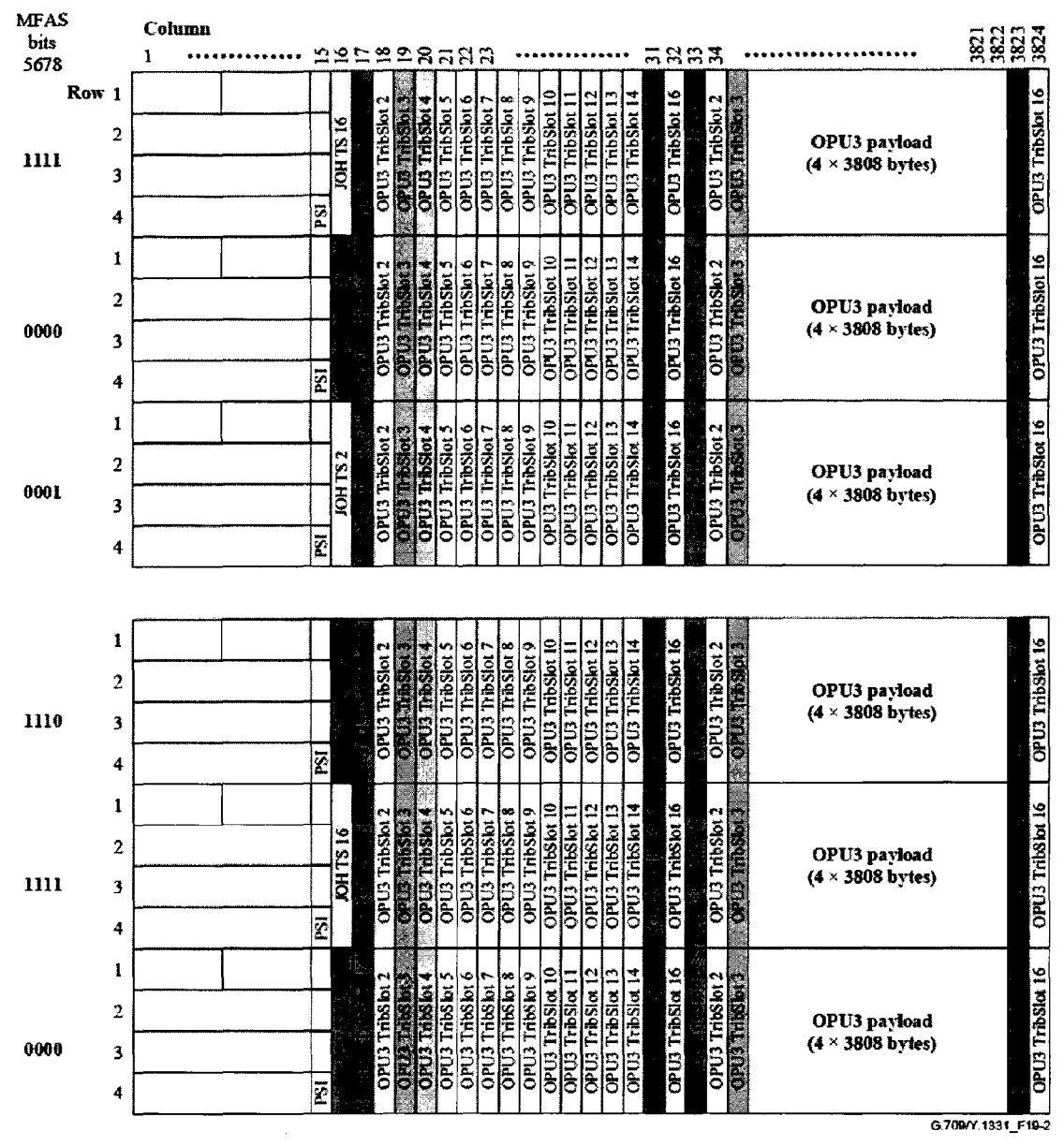

FIG. 4 illustrates 16 tributary time-slots in each OPU3 frame.

FIG. 5 shows the multiplex structure being carried in the PSI bytes over an ODU3 multi-frame.

DETAILED DESCRIPTION

Figure 2:
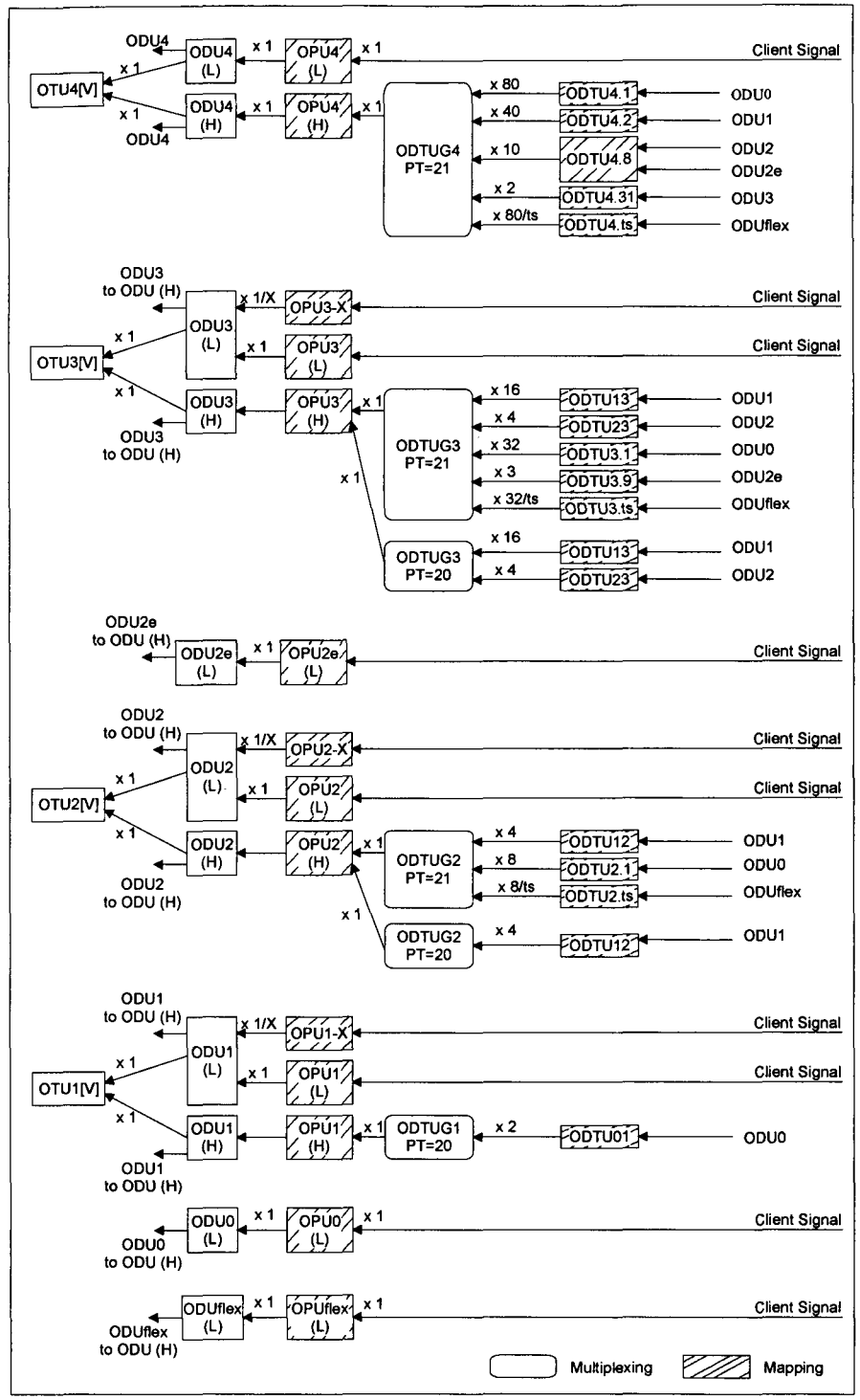
FIG. 2 illustrates multiplexing hierarchy for ODUk through ODUj
Figure 3:
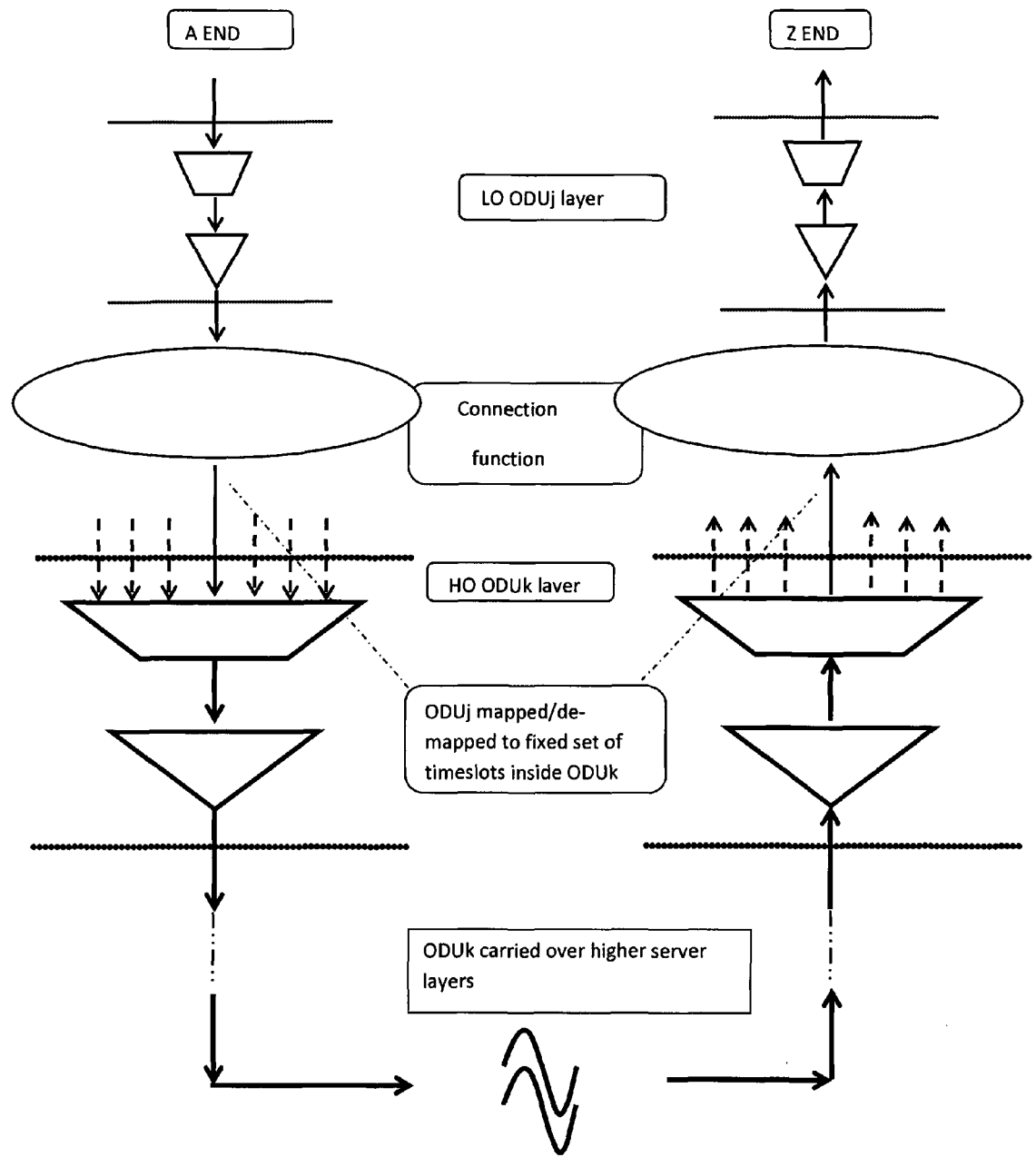
FIG. 3 illustrates a traditional time-slot based OTN network connection.

The primary embodiment of the present invention is a method of configuring end-to-end ODUj (lower order ODU) network trails across OTN (Optical Transport Network), said method comprises acts of configuring higher order ODU (ODUk) in a predefined connection policy; identifying the lower order ODUj at transmit end and receive end using a tributary port number (TPN); dynamically allocating timeslots in transmit direction; and automatically detecting timeslots in receive direction by the receiver end using corresponding receive TPN inside multiplex structure identifier (MSI) of Optical Channel Payload Unit (OPUk) for end-to-end network.

In yet another embodiment the predefined connection policy is either TPN based connection policy or time-slot based connection policy.

In still another embodiment connection between two ODUj's on a network element is identified using the TPN of the ODUj's for TPN based connection policy.

In still another embodiment the TPN based connection policy uses the TPN as an identifier for the lower order ODUj's.

In still another embodiment the time-slot based connection policy uses time-slots of the ODUk as an identifier for the lower order ODUj's.

In still another embodiment the transmit time-slots for TPN based connection policy are dynamically allocated for the ODUj inside the higher order ODUk.

In still another embodiment the MSI inside the OPUk is used to identify the receive timeslots associated with the receive TPN of the ODUj in the TPN based connection policy.

In still another embodiment for the TPN based connection policy the received MSI inside the OPUk is used to validate the capacity of the ODUj.

In still another embodiment the capacity of the ODUj is validated based on the number of time slots associated with the receive TPN of the ODUj in the TPN based connection policy.

The disclosure provides a method for configuring a network connection for ODUj centred on tributary ports numbers rather than the traditional "set of timeslots" centred model i.e. to overcome the problems associated with the background. That is in the traditional model, if one end specifies a set of time-slots of an ODUj inside ODUk, no other information is required from the user end. The associated TPN related with the ODUj trail is just to indicate a logical and physical binding of the time-slots into a single unique ODUj entity inside the ODUk. Ideally, the user or the operator can be kept agnostic of the TPNs associated with the time-slots but if one wishes to specify the TPN value also for additional level of checks in the hardware that is MSI mismatch indication, it can specify the same.

In an Embodiment of the disclosure, at either of the endpoints of a network connection, child ODUj (as a client) inside parent ODUk (as a server) is identified as follows:

ODUj identifier=[ODUk identifier], [single integer TPN value]

Since, the identity for the ODUj involves a TPN, the transmit side 'A' and receive side 'Z' have to agree upon their respective transmit and receive TPNs if the intended ODUj trail is the transport entity being connected end-to-end.

As an example of ODU2 inside ODU3, as an entity identification of an ODU2 on end-to-end basis one can set a policy between A and Z ends that states as follows:

'A' will transmit an ODU2 in question on [TPN=1]

'B' must receive the same ODU2 in question on [TPN=1]

As mentioned in the above example, to setup a connection in the network, the transmit side or the receive side has to choose one of the 16 TPNs inside the ODU3.

In the present disclosure the transmit end has to specify the TPN of the ODUj inside ODUk. The timeslot values associated with the TPN are not to be specified by the user. The timeslots are dynamically allocated on the transmit end ('A' end). On the receive end ('Z' end), there would be a capability in the ODUk adaptation sink function to find the set of timeslots associated with the TPN based on the received Multiplex Structure Identifier (MSI).

For an ODUj entity with a fixed TPN, the transmitted time-slots can change. The receive end can detect this change and based on that de-multiplex the ODUj from the ODUk.

As an example, the user at 'A' end deletes the ODUj connection associated with a fixed TPN with some allocated time-slots, uses these freed up time-slots for some other purpose. If the user A has to setup the same connection again, using the ODUj with the same TPN it can be performed. Since there is no restriction that the time-slots associated with this TPN need to be the same as in the previous connection, hence any set of valid time-slots can be assigned to this connection. On the receive side i.e. 'Z' end, there is no need to delete and re-create the old connection as it will adapt to the changed time-slot for the same TPN.

In the case of inter-operating with equipments which don't understand or not compatible with the above mentioned TPN based policy, the time-slot based policy need to be followed. Hence, the present disclosure consists of having configurability in the HO ODUk the connection policy it will follow "TPN based connection policy" or "Time-slot based connection policy".

The following is the Flow Chart Representation of the disclosure:

As illustrated in FIGS. 6 to 9, variables maintained for each ODUk within an OTUk are as follows:

RxMap is a list of tuples of the type <RxTPN, Capacity> corresponding to each ODUj configured in the Rx Direction.

TxMap is a list of tuples of the type <TxTPN, TimeSlotList> corresponding to each ODUj configured in the Tx Direction. TimeSlotList is a list of timeslots which indicate the timeslot number in the ODUk.

RxMSI are the MSI bytes that are read from the hardware device in the RxDirection.

TxMSI are the MSI bytes that are configured for transmission by a device in the TX Direction.

Figure 9:
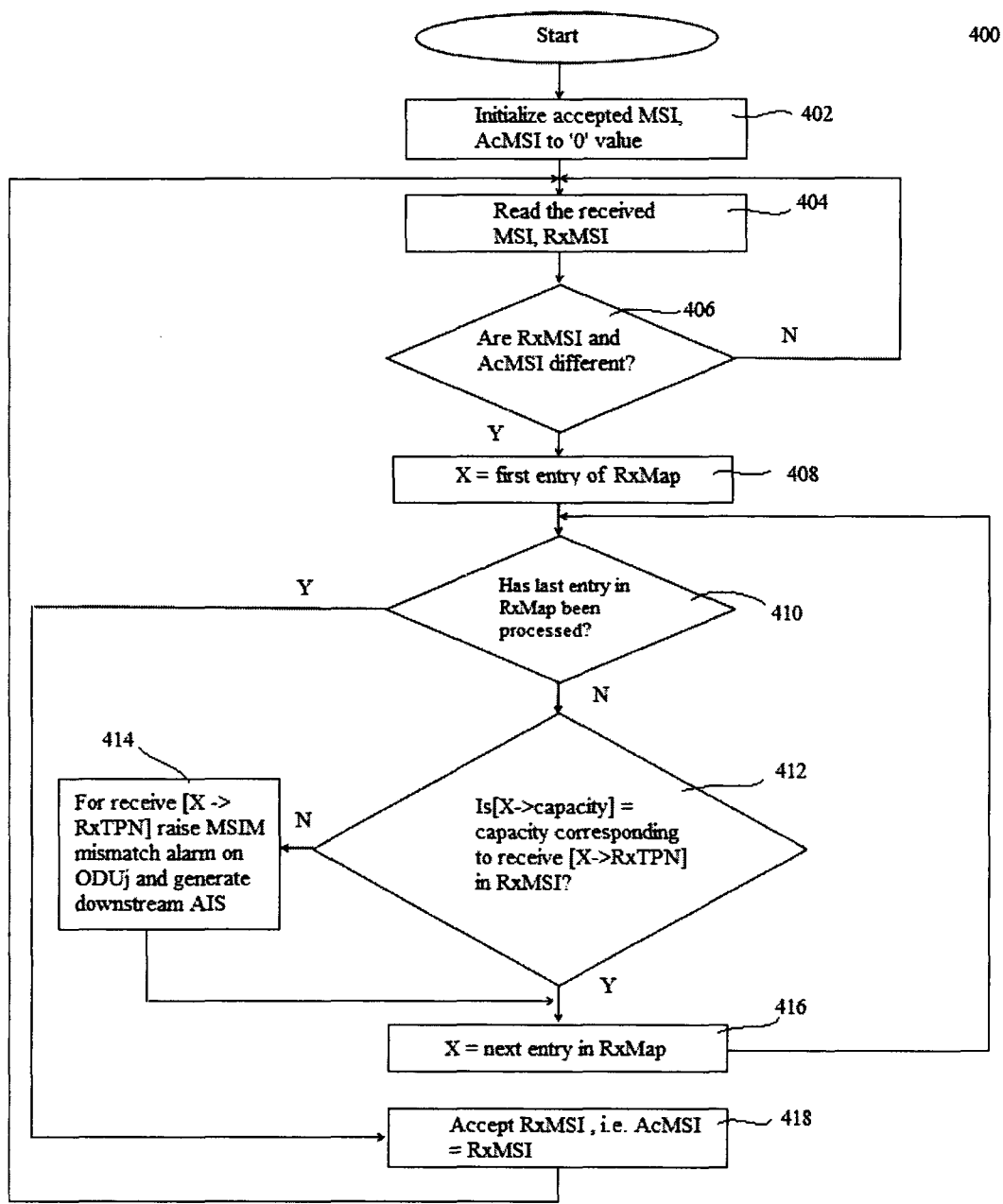
FIG. 9 illustrates a flow chart showing receive MSI monitoring process ('Z' end) of the present disclosure.

AcMSI are the MSI bytes that have been validated and accepted by the "Receive MSI Monitoring process" as shown in the FIG. 9.

Figure 6:
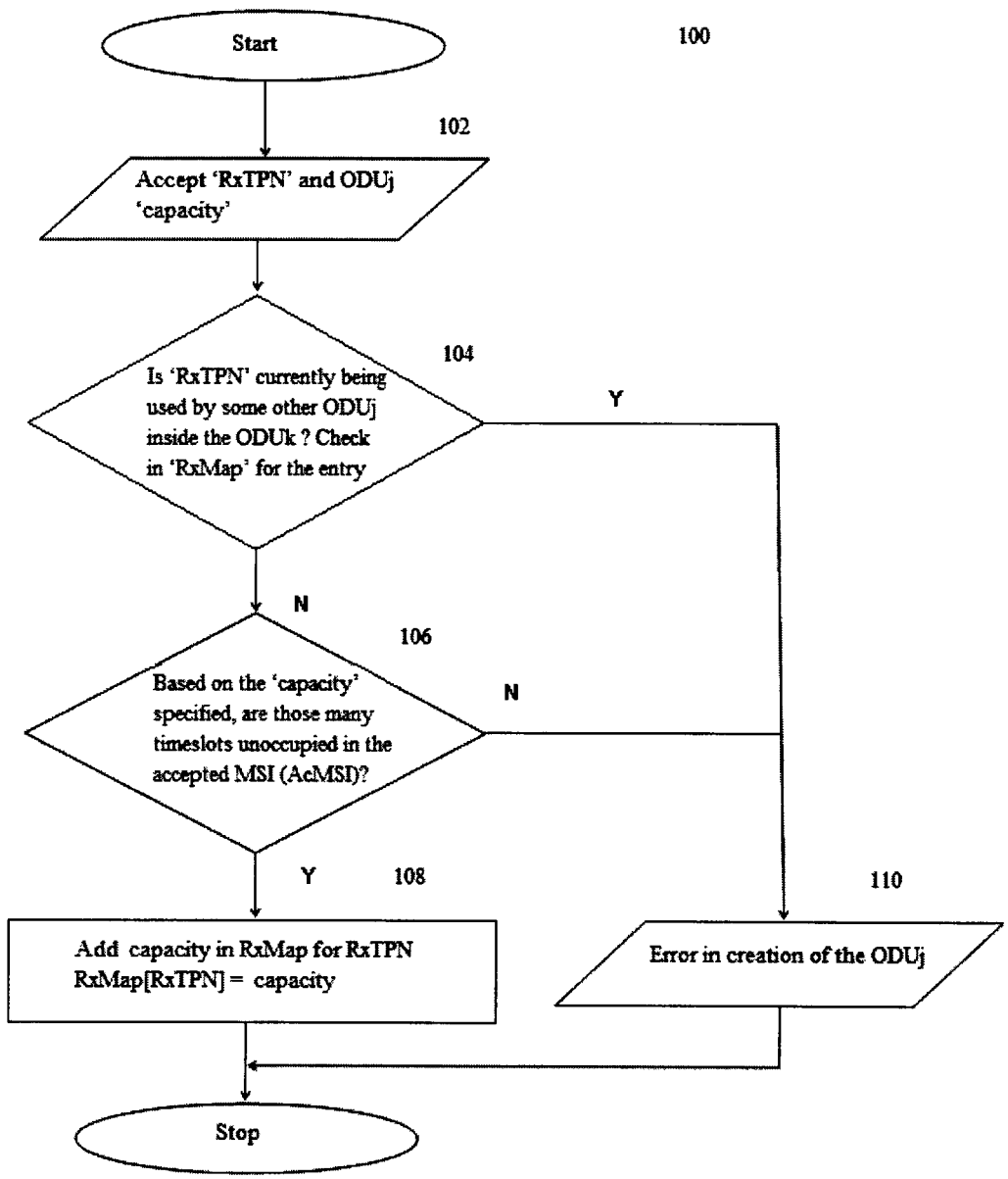
FIG. 6 illustrates a flow chart for creation of lower order receive ODUj i.e. at receive end 'Z' of the present disclosure.

FIG. 6 illustrates the creation of lower order receive ODUj at receive 'Z' end, in 100. As illustrated the Z end accepts RxTPN and ODUj capacity values, in step 102 and checks whether RxTPN is currently used by another ODUj inside an ODUk by checking for the entry of the same into RxMap, as determined in step 104. If RxTPN is not in use then, based on the capacity specified in step 106, those many timeslots unoccupied in the accepted MSI is checked. If yes add capacity in RxMap for RxTPN, as in step 108.

Figure 7:
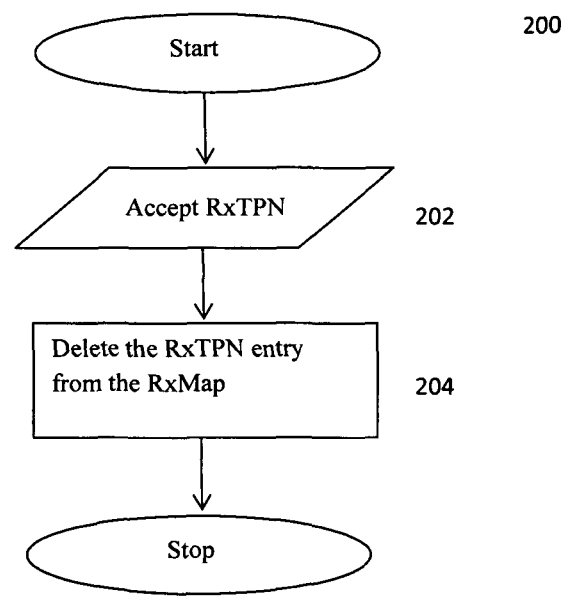
FIG. 7 illustrates a flow chart for deletion of lower order receive ODUj i.e. at receive end 'Z' of the present disclosure.

FIG. 7 illustrates the deletion of lower order receive ODUj at receive 'Z' end, in 200. The accepted RxTPN entry, in step 202 is deleted from the RxMap, in step 204.

Figure 8:
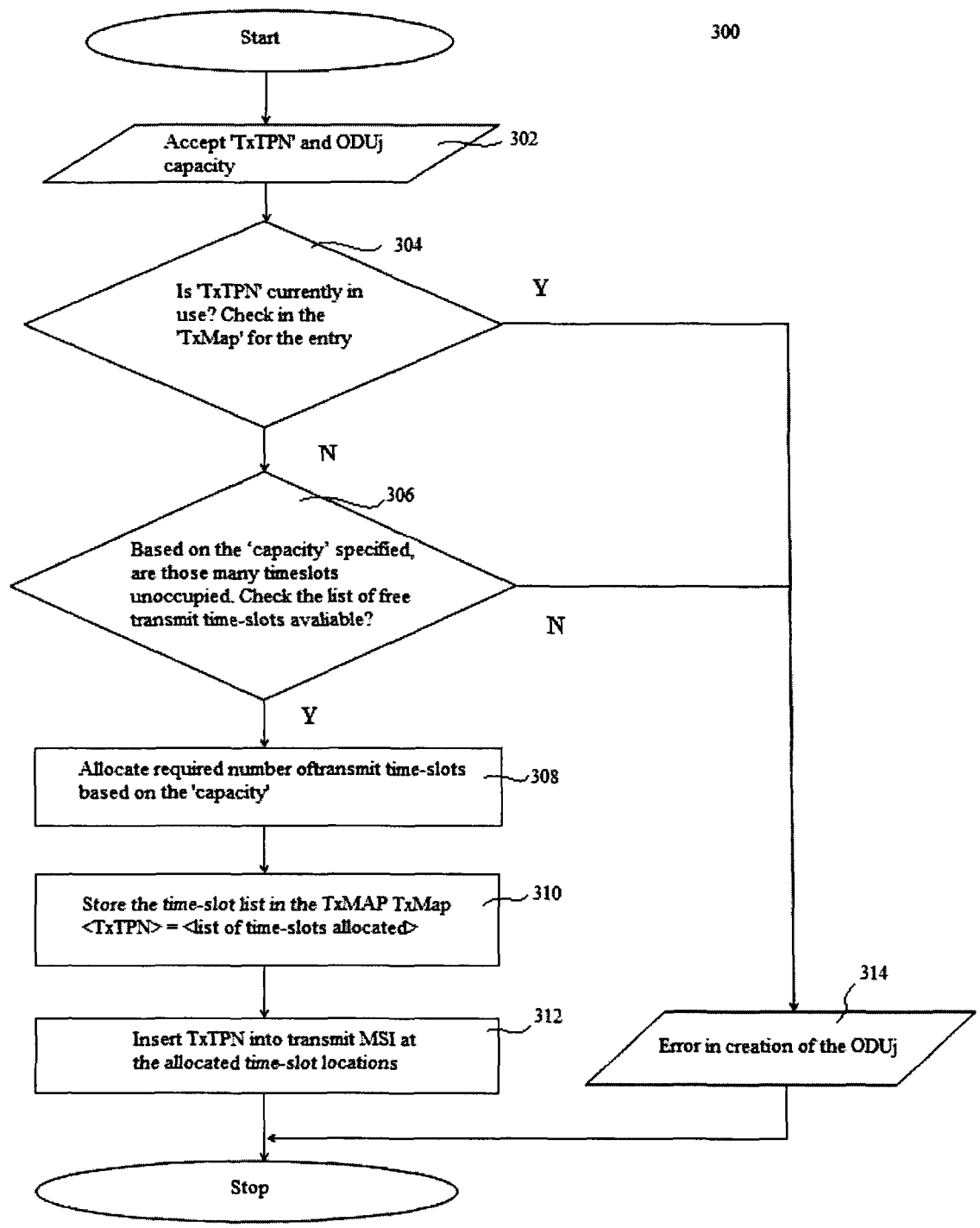
FIG. 8 illustrates a flow chart for addition of lower order transmit ODUj ('A' end) of the present disclosure.

FIG. 8 illustrates an addition of lower order transmit ODUj at transmit 'A' end, in 300. As illustrated the transmit end i.e. 'A' accepts TxTPN and ODUj capacity values, as in step 302 and checks whether TxTPN is currently used by other ODUj inside an ODUk by checking for the entry of the same into TxMap, in step 304. If TxTPN is in use then an error in creation of ODUj as occurred, which is shown in step 314. If TxTPN is not in use then, based on the capacity specified, are those many timeslots unoccupied is checked, in step 306. Also, the list of free transmit timeslots available is checked. If yes, required number of transmit timeslots based on the capacity is allocated, in step 308. Then the timeslot list is stored in the TxMAP, in step 310 and then inserted into transmit MSI at the allocated timeslot locations, in step 312.

FIG. 9 illustrates receive MSI monitoring process at 'Z' end, in 400. MSI and AcMSI are initialised to zero value, in step 402. The next step 404 is reading the received MSI (RxMSI). Checking whether RxMSI and AcMSI are different or not, in step 406. If not different, again read for the value of received MSI (RxMSI), if they are different then equate X to first entry of RxMap, in step 408. Next, checking whether the last entry in RxMap has been processed or not, in step 410, if last entry is not processed then checking for whether [X→capacity] is equal to capacity corresponding to receive [X→RxTPN] in RxMSI, in step 412, if yes equating X to next entry in RxMap, in step 416, else for receive [X→RxTPN] raise MSIM mismatch alarm on ODUj and generate downstream AIS, in step 414. If last entry in RxMap is processed, accepting RxMSI i.e. AcMSI equal to RxMSI, in step 418.

The following are the advantages of the network connection configured for ODUj centered on tributary ports (TPN based connection policy):

Ease of Connection Provisioning

One of the factors for the implementation of ODUj end to end connection using TPN is the ease of connection provisioning by a network operator. As an example, let a LO ODUflex is to be carried inside ODU4. As in an ODU4, the tributary slots are of 1.25 G granularity, the number of timeslots to be chosen from is 80. As an example, if a particular ODUflex requires 60 time-slots, the user will have to choose a set of 60 time-slots in the traditional time-slot based configuration which is quite cumbersome. In case of TPN based configuration since the user is just supposed to choose a single TPN value within range 1 to 80 and the number of time-slots for the corresponding ODUflex rate, the provisioning becomes quite simple. The set of 60 time-slots is dynamically allocated by the network element.

Ease of Connection Maintenance

Another factor is ease of connection maintenance. Connection creation, deletion, recreation is one of the routine activities in a connection-oriented transport network. In the traditional time-slot based configuration both 'A' end and 'Z' end have to agree upon the same set of time-slots chosen for a connection. As an example, let a connection which exists between 'A' end and 'Z' ends is deleted at 'A' end, the freed-up time-slots being used for the previous connection can be used by some other connection created in future. The already set up connection at 'Z' end must be deleted too so that a potential misconnection doesn't happen if the 'A' end uses the freed-up time-slots for some other connection in future. If its ensured that a misconnection won't happen at 'Z' end and hence the connection at 'Z' end need not be deleted and is maintained, if the user at 'A' end wishes to re-establish the same connection again, then 'A' end must choose the original set of time-slots as the 'Z' end is expecting the trail on the previous set of time-slots.

In the connection model of the present disclosure, the 'A' and the 'Z' end have to agree upon a single TPN value and the 'A' end is free to choose any set of time-slots as the 'Z' end can adapt to any time-slot chosen based on received MSI. Assuming the same case as mentioned in the previous paragraph, that at 'Z' end the connection is not deleted and the connection at 'A' end is to be setup again, all the user at 'A' end has to do is create the same connection with the same TPN what the 'Z' end is expecting but there is no restriction for the set of time-slots to be the same which will be dynamically allocated.

The probability of finding the same set of time-slots is much lesser than probability of finding the same TPN; hence the burden on the network operator lessens.

Optimized Label Exchange in Automatically Switched Optical Networks (ASON)

The present disclosure promotes optimized label exchange during end-to-end signalling of Label Switched Paths (LSP) by the Resource Reservation Protocol (RSVP). The Generalized Label object travels in the upstream direction in the Resv (reservation) message. Explicit Label sub-objects are used in the downstream direction (Path message) by the ERO (Explicit Route Object) or by the LSO (Label Set Object). Use of optimized labels during signalling helps in achieving low data occupancy and high utilization of the control channels. This will also impact the restoration speeds during LSP re-route. The disclosure allows the Generalized Label object to include only the available TPN and associated lower order ODUj.

ODUflex Resizing

It is expected that, an approach similar to VCAT with LCAS which involves bandwidth on demand as a guiding factor will come involving ODUflex. The mechanism in the disclosure makes things simpler from the perspective of ODUflex resizing as connection "policy" being used is a TPN and not a set of time-slots.

In the traditional time-slot based configuration the ODUflex resizing will necessitate a change in the "policy" as the number of time-slots involved as part of the initial connection setup changes dynamically.

In the TPN based configuration of this disclosure, since the "policy" doesn't involve the bandwidth factor in any form, the "policy" remains the same even if the ODUflex size changes. The same holds true from the "identity" perspective as well. The identity of the transport-entity/object doesn't change in case of resizing in TPN based approach.

The foregoing description is a specific embodiment of the present invention. It should be appreciated that this embodiment is described for purpose of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

The invention claimed is:

1. A method of configuring end-to-end ODUj (lower order ODU) network trails across OTN (Optical Transport Network), said method comprises acts of:
    configuring higher order ODU (ODUk) in a predefined connection policy;
    identifying the lower order ODUj at transmit end and receive end using a tributary port number (TPN);
    dynamically allocating timeslots in transmit direction; and
    automatically detecting timeslots in receive direction by the receiver end using corresponding receive TPN inside multiplex structure identifier (MSI) of Optical Channel Payload Unit (OPUk) for end-to-end network;
    wherein the predefined connection policy is either TPN based connection policy or time-slot based connection policy; and
    wherein connection between two ODUj's on a network element is identified using the TPN of the ODUj's for TPN based connection policy.

2. The method as claimed in claim 1, wherein the transmit time-slots for TPN based connection policy are dynamically allocated for the ODUj inside the higher order ODUk.

3. The method as claimed in claim 1, wherein the MSI inside the OPUk is used to identify the receive timeslots associated with the receive TPN of the ODUj in the TPN based connection policy.

4. A method of configuring end-to-end ODUj (lower order ODU) network trails across OTN (Optical Transport Network), said method comprises acts of:
    configuring higher order ODU (ODUk) in a predefined connection policy;
    identifying the lower order ODUj at transmit end and receive end using a tributary port number (TPN);
    dynamically allocating timeslots in transmit direction; and
    automatically detecting timeslots in receive direction by the receiver end using corresponding receive TPN inside multiplex structure identifier (MSI) of Optical Channel Payload Unit (OPUk) for end-to-end network;
    wherein the predefined connection policy is either TPN based connection policy or time-slot based connection policy; and
    wherein the TPN based connection policy uses the TPN as an identifier for the lower order ODUj's.

5. The method as claimed in claim 4, wherein the transmit time-slots for TPN based connection policy are dynamically allocated for the ODUj inside the higher order ODUk.

6. The method as claimed in claim 4, wherein the MSI inside the OPUk is used to identify the receive timeslots associated with the receive TPN of the ODUj in the TPN based connection policy.

7. A method of configuring end-to-end ODUj (lower order ODU) network trails across OTN (Optical Transport Network), said method comprises acts of:
    configuring higher order ODU (ODUk) in a predefined connection policy;
    identifying the lower order ODUj at transmit end and receive end using a tributary port number (TPN);
    dynamically allocating timeslots in transmit direction; and
    automatically detecting timeslots in receive direction by the receiver end using corresponding receive TPN inside multiplex structure identifier (MSI) of Optical Channel Payload Unit (OPUk) for end-to-end network;
    wherein the predefined connection policy is either TPN based connection policy or time-slot based connection policy; and
    wherein the time-slot based connection policy uses time-slots of the ODUk as an identifier for the lower order ODUj's.

8. The method as claimed in claim 7, wherein the transmit time-slots for TPN based connection policy are dynamically allocated for the ODUj inside the higher order ODUk.

9. The method as claimed in claim 7, wherein the MSI inside the OPUk is used to identify the receive timeslots associated with the receive TPN of the ODUj in the TPN based connection policy.

10. A method of configuring end-to-end ODUj (lower order ODU) network trails across OTN (Optical Transport Network), said method comprises acts of:
- configuring higher order ODU (ODUk) in a predefined connection policy;
- identifying the lower order ODUj at transmit end and receive end using a tributary port number (TPN);
- dynamically allocating timeslots in transmit direction; and
- automatically detecting timeslots in receive direction by the receiver end using corresponding receive TPN inside multiplex structure identifier (MSI) of Optical Channel Payload Unit (OPUk) for end-to-end network;
- wherein the predefined connection policy is either TPN based connection policy or time-slot based connection policy; and
- wherein for the TPN based connection policy the received MSI inside the OPUk is used to validate the capacity of the ODUj.

11. The method as claimed in claim 10, wherein the capacity of the ODUj is validated based on the number of time slots associated with the receive TPN of the ODUj in the TPN based connection policy.

12. The method as claimed in claim 10, wherein the transmit time-slots for TPN based connection policy are dynamically allocated for the ODUj inside the higher order ODUk.

13. The method as claimed in claim 10, wherein the MSI inside the OPUk is used to identify the receive timeslots associated with the receive TPN of the ODUj in the TPN based connection policy.

* * * * *